UNITED STATES PATENT OFFICE.

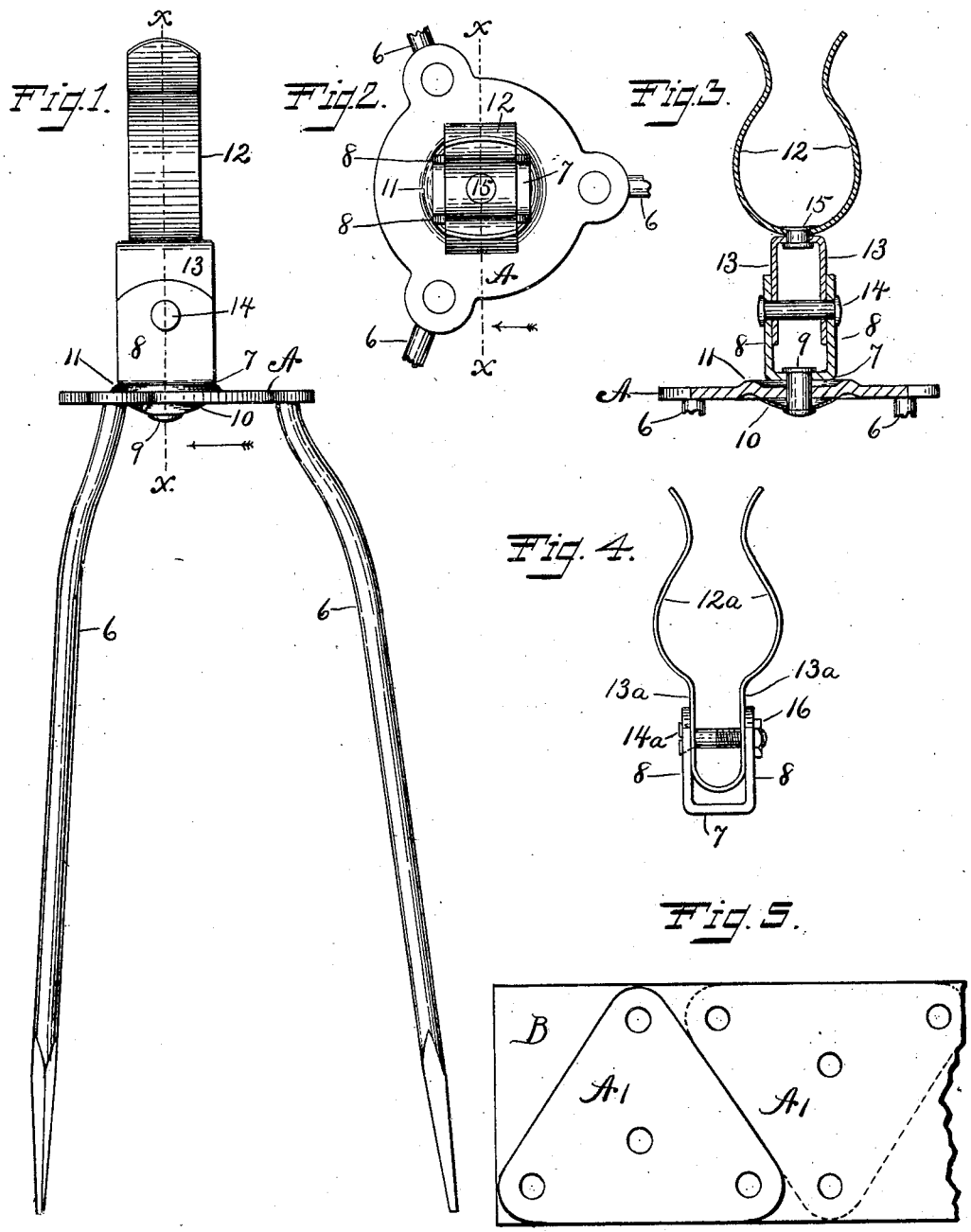

EDWARD BURNS, OF NEW BRITAIN, CONNECTICUT, ASSIGNOR TO BEATON & BRADLEY COMPANY, OF NEW BRITAIN, CONNECTICUT, A CORPORATION.

NOZZLE-HOLDER.

No. 925,680.     Specification of Letters Patent.     Patented June 22, 1909.

Application filed August 21, 1905, Serial No. 275,016. Renewed January 15, 1908. Serial No. 410,995.

*To all whom it may concern:*

Be it known that I, EDWARD BURNS, a citizen of the United States, residing at New Britain, in the county of Hartford and State of Connecticut, have invented certain new and useful Improvements in Nozzle-Holders, of which the following is a specification.

My invention relates to improvements in nozzle holders, for holding the nozzle of garden or lawn hose, and the object of my improvement is to provide a holder for the nozzle of such hose, whereby the nozzle may be set and held in any desired position for sprinkling a garden or lawn.

In the accompanying drawing:—Figure 1 is a side elevation of my nozzle holder. Fig. 2 is a plan view of the same with the legs broken off. Fig. 3 is a sectional elevation of the same on the lines $x\ x$ of Figs. 1 and 2. Fig. 4 is an edge view of parts of my holder, in a modified form. Fig. 5 is a plan view of a modified form of base for my holder, together with a portion of a strip of metal from which the same may be cut.

A, designates a suitable base consisting of a plate of any desired contour, as that shown in Fig. 2, or that of the base $A^1$ shown in Fig. 5. To the said base plate any desired number of anchoring legs or pins 6 may be rigidly secured, the said pins being preferably three in number, and having their lower ends pointed so that the said base plate may be firmly supported and held in place by forcing the said pins into the ground to a greater or less extent as may be desired. The said anchoring pins may be of any desired length so as to bring the base plate, when anchored, nearer to or farther from the ground, as may be desired.

A strip of metal is bent up in substantially the form of an angular U to form a combined swivel plate 7 and connected hinge lugs 8, the said swivel plate being secured centrally on the base plate A so as to swivel thereon by means of the pin or rivet 9. The pin or rivet should be secured with sufficient friction to make the swivel plate and hinge lugs stay in whatever position they may be turned on the swivel pin 9. In order to insure lasting friction in this swivel joint, a spring washer 10 may be placed on the swivel pin to bear upon the under face of the base plate. I also prefer to form a circular bead or elevation 11 on the top of the base plate for the swivel plate to rest upon so as to bring the friction farther from the swivel pin than it would be if the base plate were flat and the underside of the swivel plate should happen to be a little rounding.

The hose nozzle is held in the spring clamp 12, the two sides of which are curved outwardly at their ends so that the body of the hose nozzle can be forced transversely to its length, in between the said ends and into the wider space between the sides of the clamp, when the resiliency of the metal will bring the sides of the spring clamp upon the body of the hose nozzle with sufficient force to hold it firmly in the said clamp. The base of the clamp is provided with resilient hinge lugs 13 which fit in between the resilient hinge lugs 8 of the combined plate and lugs, and to which lugs 8 the lugs 13 are hinged by means of the pintle 14, which should be riveted down tightly to draw the hinge lugs firmly together, so as to make this joint friction tight for staying in place in whatever position it may be set. I prefer to make the hinge lugs 13 of the spring clamp 12 in a separate piece of metal bent into shape to form a connecting plate and lugs and secure the same to the spring portion of the clamp by means of the rivet 15. The base plate A and legs 6, constitute one form of supporting device for the plate 7 and lugs 8.

The particular form of the base plate A is not essential, and instead of the form shown in Figs. 1, 2 and 3, it may be substantially triangular as shown for the base plate $A^1$ in Fig. 5, which figure shows in broken line contour a second base plate $A^1$, together with one end of a strip of metal B from which the said plates may be cut with but little waste of stock. Instead of forming the hinge lugs of the clamp in a separate piece as shown in Figs. 1, 2 and 3, the clamp $12^a$ may be formed with integral hinge lugs $13^a$, as shown in Fig. 4. While it is believed that the hinge pintle in the two pairs of resilient hinge lugs may be riveted firmly enough to give permanent holding friction to the hinge joint, the pintle may be formed of a bolt $14^a$ provided with a nut 16 so as to adjust the friction as may be desired, or to restore the friction in case it should be lost. It is of course evident that pintle 14 or bolt $14^a$ may be substituted the one for the other in either of the constructions shown. The spring clamp and hinge shown in Fig. 4, may be mounted on any suitable support which may, if desired, be the same as that shown for supporting the corresponding part in Figs. 1, 2 and 3.

To use the device it is anchored in the ground by means of the anchoring legs or pins so as to firmly hold the base plate in the desired position a little above the surface of the ground. The body of the hose nozzle is forced into the jaws of the spring clamp so as to be embraced and held thereby. The hose may be pointed in any desired direction, horizontally, by turning it and the clamp on the swivel pin and will be held in proper position by the friction of the joint. The nozzle may be tilted to give the desired elevation or incline by turning it on the friction tight hinge lugs which will hold the nozzle at the incline on which it is set.

By my improvement the inner pair of resilient hinge lugs are always free to yield inwardly so as to permit the said lugs to turn readily on their pintle for adjustment, no matter how tightly the hinge pintle may be headed, and at the same time there is always sufficient friction on the said lugs to hold the spring clamp in its adjusted position, whereby a screw threaded adjustment of the hinge pintle is unnecessary.

It is apparent that some changes from the specific construction herein disclosed may be made and therefore I do not wish to be understood as limiting myself to the precise form of construction shown and described, but desire the liberty to make such changes, in working my invention, as may fairly come within the spirit and scope of the same.

I claim as my invention:—

1. A nozzle holder, comprising a pair of separated resilient hinge lugs, supporting devices for the said lugs, a spring clamp having yieldingly holding sides at its upper end and separated resilient hinge lugs at its lower end, and a hinge pintle passing through both pairs of hinge lugs to form a hinge for holding the said lugs in yielding frictional contact with each other under the tension due to the resiliency of the metal of the said lugs, to permit the clamp carrying hinge lugs to be readily adjusted and held frictionally in place when adjusted.

2. A nozzle holder comprising a suitable support, a combined plate and resilient hinge lugs separated from each other by an open space, the said plate and lugs being in substantially the form of an angular U of which the bottom portion constitutes the connecting plate for the said resilient lugs, a second pair of resilient hinge lugs formed of sheet metal bent into substantially the from of an angular U and separated from each other by an open space, one pair of the said resilient lugs being arranged between the other pair, a hinge pintle connecting the said two pairs of resilient lugs and yieldingly confining them under tension due to their resiliency, and a spring clamp consisting of a separate strip of resilient metal doubled upon itself and forming a pair of connected open sides for yieldingly clamping the hose, the said clamp being secured to the upper pair of the said resilient hinge lugs.

3. A nozzle holder comprising a base plate, anchoring pins rigidly secured thereto, a combined swivel plate and hinge lugs placed on one side of the said base plate, a spring washer placed on the opposite side of the said plate, a swivel pin connecting the said swivel plate, base plate and spring washer, and a hose clamp hinged to the lugs of the said swivel plate.

EDWARD BURNS.

Witnesses:
 WM. R. BENNETT,
 JAMES SHEPARD.